United States Patent
Mallard et al.

(10) Patent No.: US 8,418,652 B1
(45) Date of Patent: Apr. 16, 2013

(54) ANIMAL LITTER AND ASSOCIATED METHODS

(75) Inventors: Elliott Mallard, Ocala, FL (US); Jack Hollrah, Ocala, FL (US); Todd Zielinski, Ocala, FL (US)

(73) Assignee: MFM Industries, Inc., Reddick, FL (US)

( * ) Notice: Subject to any disclaimer, the term of this patent is extended or adjusted under 35 U.S.C. 154(b) by 119 days.

(21) Appl. No.: 12/884,924

(22) Filed: Sep. 17, 2010

Related U.S. Application Data

(60) Provisional application No. 61/243,337, filed on Sep. 17, 2009.

(51) Int. Cl.
*A01K 1/01* (2006.01)

(52) U.S. Cl.
USPC ............................................ 119/171

(58) Field of Classification Search ............ 119/171, 119/173
See application file for complete search history.

(56) References Cited

U.S. PATENT DOCUMENTS

| | | | |
|---|---|---|---|
| 3,789,797 A | 2/1974 | Brewer | |
| 3,921,581 A | 11/1975 | Brewer | |
| 3,941,090 A * | 3/1976 | Fry ................. | 119/171 |
| 4,386,579 A | 6/1983 | Harsh et al. | |
| 4,506,628 A | 3/1985 | Stockel | |
| 4,519,340 A * | 5/1985 | Dickey ............ | 119/171 |
| 4,676,196 A | 6/1987 | Lojek et al. | |
| 5,000,115 A | 3/1991 | Hughes | |
| 5,016,568 A | 5/1991 | Stanislowski et al. | |
| 5,018,482 A | 5/1991 | Stanislowski et al. | |
| 5,044,324 A | 9/1991 | Morgan et al. | |
| 5,154,594 A * | 10/1992 | Gamlen ............ | 119/171 |
| 5,183,010 A | 2/1993 | Raymond et al. | |
| 5,183,655 A | 2/1993 | Stanislowski et al. | |
| 5,216,980 A | 6/1993 | Kiebke | |
| 5,271,355 A | 12/1993 | Bilings | |
| 5,542,374 A | 8/1996 | Palmer, Jr. | |
| 5,775,259 A | 7/1998 | Tucker | |
| 5,884,584 A | 3/1999 | Feldman | |
| 5,927,049 A | 7/1999 | Simard | |
| 6,363,888 B1 | 4/2002 | Sourek, Jr. | |
| 6,401,662 B1 | 6/2002 | Sourek, Jr. | |
| 6,619,234 B2 | 9/2003 | Sourek, Jr. | |
| 6,837,181 B2 | 1/2005 | Schulein, Jr. et al. | |
| 7,434,540 B2 * | 10/2008 | Aylen et al. .......... | 119/173 |
| 7,757,638 B2 * | 7/2010 | Wang et al. .......... | 119/173 |
| 7,942,113 B2 * | 5/2011 | Chen .................. | 119/171 |
| 2003/0148100 A1 | 8/2003 | Greene et al. | |
| 2003/0200936 A1 | 10/2003 | Raymond et al. | |
| 2003/0209203 A1 | 11/2003 | Opfel | |
| 2004/0025422 A1 | 2/2004 | MacQuoid et al. | |
| 2005/0160997 A1 | 7/2005 | Weaver | |
| 2005/0166857 A1 | 8/2005 | Deroo et al. | |
| 2006/0102085 A1 | 5/2006 | Chen | |

* cited by examiner

*Primary Examiner* — Yvonne Abbott

(74) *Attorney, Agent, or Firm* — Jason S. Miller; Lowndes, Drosdick, Doster, Kantor & Reed, P.A.

(57) ABSTRACT

An animal litter composition includes bentonite clay, montmorillonite clay, and pieces of pine wood. In a particular embodiment, the animal litter composition has the following proportions of components by weight: bentonite clay, 40-70%; montmorillonite clay, 20-50%; and pine wood, 5-20%. In another embodiment, an animal litter composition has the following approximate proportions of components by weight: bentonite clay, 40-70%; montmorillonite clay, 20-50%; pine wood, 1-5%; and cedar wood, 2-8%. The clay mixture is believed to provide superior clumping characteristics over animal litters known in the art, and the pine wood, having a hollow capillary vessel structure, serves as a "biofilter," effectively trapping moisture and odor.

12 Claims, No Drawings

ANIMAL LITTER AND ASSOCIATED METHODS

CROSS-REFERENCE TO RELATED APPLICATION

This application claims priority to provisional patent application 61/243,337, filed Sep. 17, 2009.

BACKGROUND OF THE INVENTION

1. Field of the Invention

The present invention relates to animal litter and methods of making same.

2. Description of Related Art

Many compositions of animal litter are known in the art. Two characteristics that are deemed desirable are the ability to absorb moisture and the ability to neutralize odors from animal waste deposited therein.

Animal litter compositions known in the art are known to include various types of clays and wood/cellulosic products. Until now, non-pelletized, non-agglomerated animal litter products known in the art comprising clay or wood have contained either over 95% clay by weight or over 95% wood by weight.

However, it would be beneficial to provide an animal litter with superior clumping and odor-eradicating properties that is completely natural, organic, and free from artificial fragrances and chemicals.

SUMMARY OF THE INVENTION

The present invention is directed to an animal litter composition that in an embodiment comprises bentonite clay, montmorillonite clay, and pieces of pine wood. In a particular embodiment, not intended as a limitation, the animal litter composition has the following approximate proportions of components by weight: bentonite clay, 40-70%; montmorillonite clay, 20-50%; and pine wood, 5-20%. One of skill in the art, in light of the teachings of the present invention, will appreciate that like components could be substituted without departing from the spirit of the invention.

In another embodiment, an animal litter composition has the following approximate proportions of components by weight: bentonite clay, 40-70%; montmorillonite clay, 20-50%; pine wood, 1-5%; and cedar wood, 2-8%. One of skill in the art, in light of the teachings of the present invention, will appreciate that like components could be substituted without departing from the spirit of the invention.

The clay mixture is believed to provide superior clumping characteristics over animal litters known in the art, and the pine wood, having a hollow capillary vessel structure, serves as a "biofilter," effectively trapping moisture and odor.

Another animal litter embodiment comprises the following approximate proportions of components by weight: montmorillonite clay, 80-95%; and wood product comprising one or both of cedar and pine, 5-20%.

Thus the embodiments of the invention described herein combine in moderate amounts a clay product and a wood product without agglomerating or pelletizing, in a specific particle size mix designed for superior performance, characteristics not believed existing in the art at present.

DETAILED DESCRIPTION OF THE PREFERRED EMBODIMENTS

A description of the preferred embodiments of the present invention will now be presented.

A first embodiment of an animal litter composition comprises bentonite clay, montmorillonite clay, pieces of pine wood, and guar. In a particular embodiment, not intended to be limiting, the components are present in the following proportions by weight: bentonite clay, 40-70%; montmorillonite clay, 20-50%; pine wood, 5-20%; and guar gum, 0.25-0.75%. In an embodiment believed to represent the best mode as of the date of filing, which is not intended as a limitation on the invention, the components are present in the following approximate proportions by weight: bentonite clay, 55.00%; montmorillonite clay, 38%; pine wood, 7%; and guar gum, 0.5%. In a particular embodiment, the composition can also comprise cedar fragrance present in a range of 0.05-0.3% by weight, and, more specifically in a best mode, 0.15% by weight In a preferred embodiment, the pine wood comprises pine wood fiber that is recycled, natural, and kiln-dried.

It has been found that the particular type of pine wood contains hollow capillary vessels that effectively trap moisture and odor, thereby functioning as miniature "bio-filters" to combat the unpleasant ammonia smell associated with cat waste.

The guar gum is added to the montmorillonite clay for enhancing the clumping qualities of the litter.

In second embodiment, also not intended to be limiting, the components are present in the following approximate proportions by weight: bentonite clay, 40-70%; montmorillonite clay, 20-50%; pine wood, 1-5%; cedar wood, 2-8%, guar gum, 0.10-0.75%. A particular embodiment further comprises cedar fragrance, 0.05-0.3%. In a specific embodiment, the components are present in the following percentages by weight: bentonite clay, 55.00%; montmorillonite clay, 38%; pine wood, 2%; cedar wood, 5%; guar gum, 0.5%; and cedar fragrance, 0.15%.

It has been found that the particle sizes of the components are an important feature of the invention. In an embodiment of the animal litter composition, at least greater than 80% of each component passes a respective mesh size as follows: bentonite clay, 4 mesh; montmorillonite clay, 10 mesh, pine wood, 4 mesh; and cedar wood, 10 mesh. Further, 99% of the composition will not pass through a 100-mesh screen.

Additionally, the cedar wood comprises coarse cedar shavings having a bulk density of $6\pm2$ lbs/ft$^3$ and fine cedar shavings having a bulk density of $10\pm2$ lbs/ft$^3$. Preferably at least 80% of the coarse cedar shavings pass a 10 mesh and a maximum of 15% pass a 20 mesh; and at least 90% of the fine cedar shavings pass a 10 mesh and a maximum of 5% pass a 50 mesh. Also preferably, each component has a maximum moisture content of approximately $10\pm2$%.

In a third embodiment, a composition can comprise components present in the following proportions by weight: montmorillonite clay, 10%; cedar wood, 7%; and cedar fragrance, 0.15%.

The compositions can be used by dispensing to a depth of approximately 3 inches in a litter box. Clumps can be removed daily, with litter added to maintain a substantially constant 3-in. depth. The litter should be changed out completely approximately every 2 weeks.

The first and second embodiments of the animal litter compositions of the present invention is 50% lighter than 100% bentonite cat litters, combining bentonite clay, which has superior characteristics for hard clumping, swelling, sealing, and clumping when wet; white montmorillonite clay, which has enhanced odor control and absorption against 100% sodium bentonite cat litters, holding moisture within the molecular structure, locked away from the atmosphere; and kiln-dried pine, which has superior odor control and lightness owing to its hollow capillary vessels. The composition can absorb two times its own weight in moisture. The composition is soft on animals' paws; so no staged transition is required when beginning its use.

The lightness of the composition makes it easier to dispose of, and its natural ingredients have no negative impact on the environment when disposed of. In addition, since the pine wood is recycled, the environment is positively impacted by its use.

The composition is proportioned to minimize tracking of clay particles out of the litter box, which can irritate the feet and damage floors and rugs.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. An animal litter composition comprising bentonite clay, montmorillonite clay, cedar wood, guar gum, and pine wood having the following ranges of proportions of components by weight: bentonite clay, 40-70%; montmorillonite clay, 20-50%; and pine wood, 1-5%, and cedar wood, 2-8%, and guar gum, 0.10-0.75%, wherein at least greater than 80% of each component passes a respective mesh size as follows: bentonite clay, 4 mesh; montmorillonite clay, 10 mesh, pine wood, 4 mesh; and cedar wood, 10 mesh.

2. The animal litter composition recited in claim 1, having the following proportions of components by weight: bentonite clay, 55%; montmorillonite clay, 38%; and pine wood, 7%.

3. The animal litter composition recited in claim 2, wherein the guar gum present is at approximately 0.5% by weight.

4. The animal litter composition recited in claim 1, wherein the pine wood comprises kiln-dried pine wood.

5. The animal litter composition recited in claim 1, wherein the composition comprises substantially no non-organic matter and substantially no non-natural fragrances.

6. The animal litter composition recited in claim 1, wherein the pine wood comprises recycled pine wood.

7. The animal litter composition recited in claim 1, further comprising cedar fragrance.

8. The animal litter composition recited in claim 7, further comprising cedar fragrance present in an approximate proportion of 0.05-0.3% by weight.

9. The animal litter composition recited in claim 8, wherein the cedar fragrance is present at an approximate proportion of 0.15%.

10. The animal litter composition recited in claim 1, wherein the cedar wood comprises coarse cedar shavings having a bulk density of 6±2 lbs/ft3 and fine cedar shavings having a bulk density of 10±2 lbs/ft3.

11. The animal litter composition recited in claim 10, wherein at least 80% of the coarse cedar shavings pass a 10 mesh and a maximum of 15% pass a 20 mesh; and at least 90% of the fine cedar shavings pass a 10 mesh and a maximum of 5% pass a 50 mesh, and approximately 99% of the composition does not pass through a 100 mesh.

12. The animal litter composition recited in claim 1, wherein each component has a maximum moisture content of approximately 10±2%.

\* \* \* \* \*